(12) United States Patent
Chu et al.

(10) Patent No.: US 11,866,969 B2
(45) Date of Patent: Jan. 9, 2024

(54) INTEGRATED HINGE FOR FURNITURE

(71) Applicant: Chen Ying Paulina Chu, Hong Kong (HK)

(72) Inventors: Chen Ying Paulina Chu, Hong Kong (HK); Frederic Frans Petrus Gooris, Hong Kong (HK); Francesco Pozzato, Hong Kong (HK)

(73) Assignee: Chen Ying Paulina Chu, Hong Kong (HK)

( * ) Notice: Subject to any disclaimer, the term of this patent is extended or adjusted under 35 U.S.C. 154(b) by 91 days.

(21) Appl. No.: 17/424,503

(22) PCT Filed: Mar. 19, 2020

(86) PCT No.: PCT/CN2020/080195
§ 371 (c)(1),
(2) Date: Jul. 21, 2021

(87) PCT Pub. No.: WO2020/187290
PCT Pub. Date: Sep. 24, 2020

(65) Prior Publication Data
US 2022/0090423 A1    Mar. 24, 2022

(30) Foreign Application Priority Data

Mar. 19, 2019 (HK) .................. 19121204.2

(51) Int. Cl.
*E05D 1/00* (2006.01)
*A47C 4/00* (2006.01)
(Continued)

(52) U.S. Cl.
CPC ................. *E05D 1/00* (2013.01); *A47C 4/00* (2013.01); *A47C 17/04* (2013.01); *A47D 1/006* (2013.01);
(Continued)

(58) Field of Classification Search
CPC ....... Y10T 16/525; Y10T 16/548; E05D 1/00; E05D 1/02; E05D 1/06; E05D 9/005;
(Continued)

(56) References Cited

U.S. PATENT DOCUMENTS 3,169,611 A * 2/1965 Snelson .................... E04B 1/19
256/37
3,441,975 A * 5/1969 Shepherd .................. E05D 1/02
16/385

(Continued)

FOREIGN PATENT DOCUMENTS

CN    1144514 A    3/1997
CN    2799754 Y    7/2006
(Continued)

OTHER PUBLICATIONS

Extended European Search Report of corresponding European patent application No. 20773958.2 dated Nov. 4, 2022.
(Continued)

*Primary Examiner* — Chuck Y Mah
(74) *Attorney, Agent, or Firm* — Idea Intellectual Limited; Margaret A. Burke; Sam T. Yip

(57) ABSTRACT

An integrated hinge for connecting an article of a furniture assembly to one or more articles or a main body of the furniture assembly comprising a multi-rod rigid structure and a flexible membrane. The multi-rod rigid structure comprises two or more rods arranged in a default shape, wherein each of the rods functions as a hinge arm, and wherein the rods are lateral-rotatable or pivot-able about an intersecting or meeting point of the rods. The flexible membrane has a three-dimensional contour configured to wrap around the multi-rod rigid structure tightly, fixing the multi-rod rigid structure in its default shape. The flexible membrane can be configured to wrap around the integrated hinge and articles of furniture assembly forming a single
(Continued)

integrated furniture piece. The elasticity in the flexible membrane turns the integrated hinge into a spring hinge.

13 Claims, 6 Drawing Sheets

(51) Int. Cl.
*A47C 17/04* (2006.01)
*A47D 1/00* (2006.01)

(52) U.S. Cl.
CPC ..... *E05Y 2800/678* (2013.01); *E05Y 2800/68* (2013.01); *E05Y 2900/20* (2013.01)

(58) Field of Classification Search
CPC . E05D 7/00; E05Y 2800/68; E05Y 2800/344; E05Y 2800/676; E05Y 2800/678; E05Y 2900/602; B29L 2031/22; B29C 51/00; B29C 65/70; B29C 65/30; B29C 66/71; B29C 66/712; B29K 2105/06; B29K 2105/089; F16C 11/12
See application file for complete search history.

(56) References Cited

U.S. PATENT DOCUMENTS

| | | | | |
|---|---|---|---|---|
| 3,474,488 A | * | 10/1969 | Kruzich | B64G 99/00 16/225 |
| 3,670,358 A | * | 6/1972 | Schwartz | B64G 99/00 16/225 |
| 3,939,620 A | * | 2/1976 | Bero | E06B 3/28 52/775 |
| 4,069,832 A | * | 1/1978 | Bingham | E04H 15/48 428/542.2 |
| 4,115,975 A | * | 9/1978 | Bliss | E04B 1/19 52/646 |
| 4,208,037 A | * | 6/1980 | Le Gal | A47D 13/065 256/25 |
| 4,337,560 A | * | 7/1982 | Slysh | E04B 1/19 343/915 |
| 7,278,245 B2 | | 10/2007 | Rouse | |
| 7,401,367 B2 | * | 7/2008 | Gehr | A47D 13/063 5/98.1 |
| 7,578,307 B2 | * | 8/2009 | Ung | E04H 15/425 52/645 |
| 8,434,196 B1 | | 5/2013 | Murphey et al. | |
| 8,833,000 B1 | | 9/2014 | Nadeau | |
| 8,955,904 B1 | * | 2/2015 | Zhu | A47C 4/00 297/46 |
| 2002/0002807 A1 | * | 1/2002 | Newland | E04B 1/19 52/645 |
| 2002/0153034 A1 | * | 10/2002 | Miller | E04B 1/3211 52/645 |
| 2004/0078890 A1 | | 4/2004 | Tavivian | |
| 2004/0261351 A1 | * | 12/2004 | Ung | E04H 15/425 52/693 |
| 2008/0115816 A1 | * | 5/2008 | Miller | E04H 15/44 135/126 |
| 2015/0101645 A1 | * | 4/2015 | Neville | A01G 9/16 135/125 |

FOREIGN PATENT DOCUMENTS

| | | | |
|---|---|---|---|
| CN | 101523003 A | 9/2009 | |
| CN | 105966735 A | 9/2016 | |
| CN | 107736761 A | 2/2018 | |
| DE | 202011000882 U1 | 8/2011 | |
| EP | 1287776 A1 | 3/2003 | |
| EP | 1464784 A1 | 10/2004 | |
| EP | 2475154 A1 | 7/2012 | |
| FR | 2433318 A1 | 3/1980 | |
| FR | 2609306 B1 | 11/1991 | |
| IE | 39245 L | 11/1974 | |
| WO | WO-03066983 A1 * | 8/2003 | ........... E04B 1/3441 |
| WO | 2017167833 A1 | 10/2017 | |
| WO | WO-2018161089 A1 * | 9/2018 | ......... B25J 19/0091 |

OTHER PUBLICATIONS

Office Action of corresponding China patent application No. 202080010301.6 dated May 5, 2022.

* cited by examiner

INTEGRATED HINGE FOR FURNITURE

FIELD OF THE INVENTION

The present invention generally relates to furniture and the manufacture thereof. More specifically, the present invention relates to transformable, portable, and foldable furniture.

BACKGROUND

As modern urban living quarters are becoming smaller and smaller, transformable furniture are gaining popularity as one piece of space-saving furniture may serve different functions depending on its configuration. Most transformable furniture, such as a coffee-dining convertible table, usually have moving parts to enable a flexible structure. Similarly, portable furniture that can be stowed away for easy storage and transportation incorporate at least some form of foldable or collapsible assembly to enable shrinking and shapeshifting. These assemblies are often implemented by using mechanical hinges and joints connecting furniture articles such as beams and panels. However, furniture constructed from these assemblies demand higher construction complexity and number of components than conventional furniture, and these in turn translate to higher manufacturing and material costs, and also likely overall weight increase.

Therefore, there is an unmet need for a method and apparatus for constructing transformable and portable furniture that are structurally flexible, simple in construction, and light in weight.

SUMMARY OF THE INVENTION

One of the objectives of the present invention is to provide a method and apparatus for constructing a transformable and/or portable furniture that is structurally flexible, simple in construction, and light in weight based on integrated hinges connecting articles of the furniture assembly. Each of the integrated hinges comprises a rigid structure enclosed within a three dimensional (3D) flexible membrane that contour around the rigid structure.

In accordance to various embodiments of the present invention, the rigid structure can be two rods arranged in a cross-shaped structure, two rods arranged in a 'V'-shaped structure, two rods arranged in a 'T'-shaped structure, three rods arranged in a three-pointed star-shaped structure, or four rods arranged in a four-pointed star-shaped structure. It will be apparent to an ordinarily-skilled person in the art that other shaped rigid structures having different number of rods for facilitating different types of movements of the connecting parts are realizable without deviating from the spirit of the present invention.

The shape of the multi-rod rigid structure of the various configurations is not necessarily fixed by any fixing accessory (e.g. pin, nail, screw, bearing, clamp, etc.), instead the rigid structure is wrapped tightly in the flexible membrane with its 3D contour holding the rigid structure in place. This way, the number of parts of the complete furniture can be kept minimal.

In accordance to one embodiment, the rods of the rigid structure of the integrated hinge function as hinge arms. An article of the furniture assembly, such as a supporting beam, a leg, an apron, a base, a top, a deck, a door, and/or a surface panel is connected to one of the rods of the rigid structure, preferably near an end of the rod distal from the other rod(s) such that the connected articles are allowed to rotate, pivot, and/or shift in respect with one and other or the furniture main body about the rigid structure depending on the configuration of the rigid structure. A foldable or collapsible overall furniture assembly is then constructed using the plurality of integrated hinges connecting the furniture articles.

In accordance to one embodiment, the one or more integrated hinges are integrated with one or more further articles, the flexible membrane encloses the rigid structures of the hinges as well as the one or more furniture articles as one integrated piece.

In accordance to one embodiment, the flexible membrane is made of elastic material such that the integrated hinge serves as a spring hinge with a biased position. The furniture assembly incorporating the integrated hinges and elastic flexible membrane may be able to provide a default configuration without the use of any locking mechanism.

In accordance to one exemplary application, provided is a collapsible infant cradle constructed using a number of integrated hinges, each having a cross-shaped rigid structure. In accordance to another exemplary application, a foldable booster seat is provided, which is constructed using a number of integrated hinges of different shaped rigid structures. It will be apparent to an ordinarily-skilled person in the art that other applications incorporating the integrated hinges in their constructions are realizable without deviating from the spirit of the present invention.

BRIEF DESCRIPTION OF THE DRAWINGS

Embodiments of the invention are described in more detail hereinafter with reference to the drawings, in which.

DETAILED DESCRIPTION OF THE INVENTION

In the following description, methods and apparatuses for constructing a transformable and/or portable furniture that is structurally flexible, simple in construction, and light in weight based on integrated hinges connecting articles of the furniture assembly and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
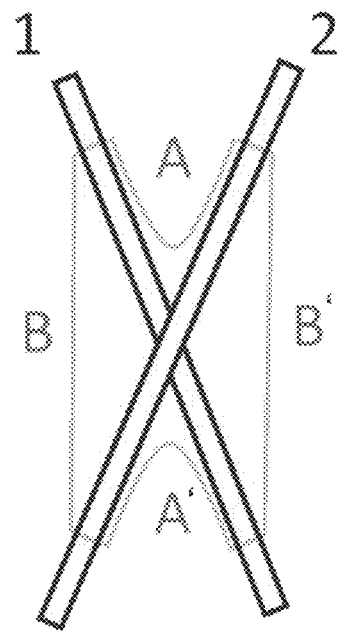
FIG. 1A depicts an integrated hinge having a cross rigid structure in accordance to an embodiment of the present invention.
Figure 1A:
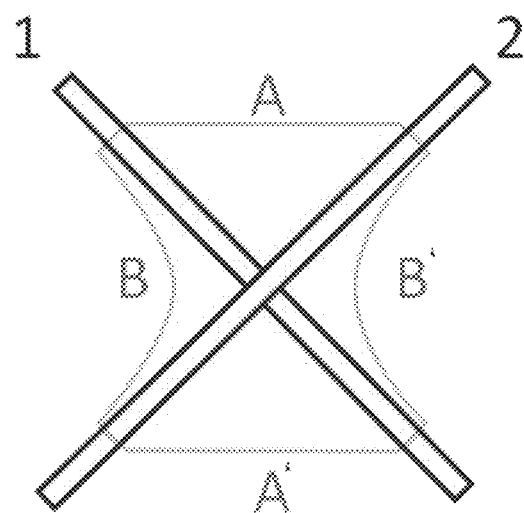
Figure 1B:
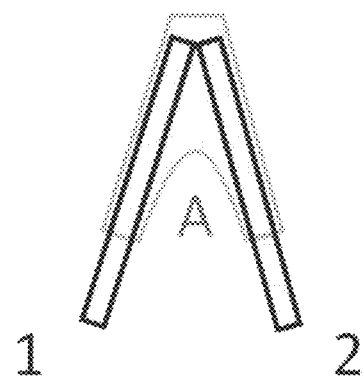
FIG. 1B depicts an integrated hinge having a 'V'-shaped rigid structure in accordance to an embodiment of the present invention.
Figure 1B:
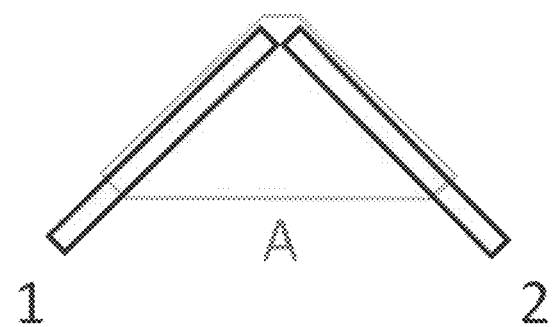
Figure 1C:
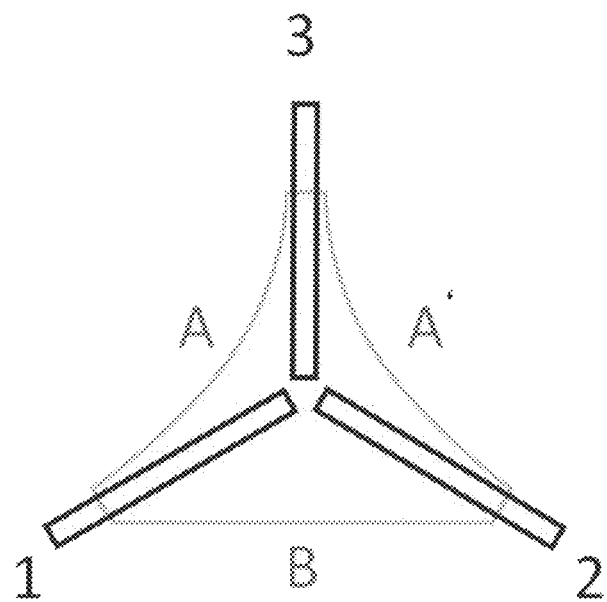
FIG. 1C depicts an integrated hinge having a three-pointed star-shape rigid structure in accordance to an embodiment of the present invention.
Figure 1C:
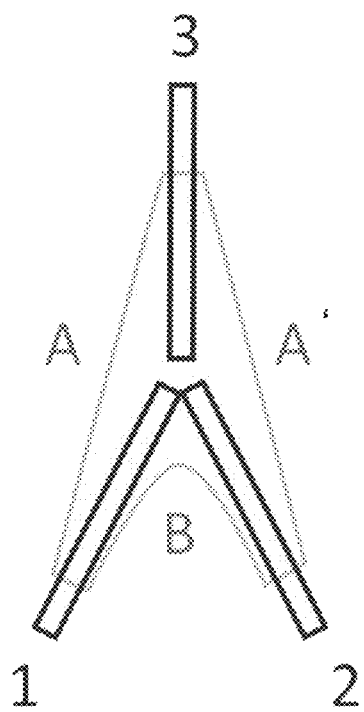
Figure 1D:
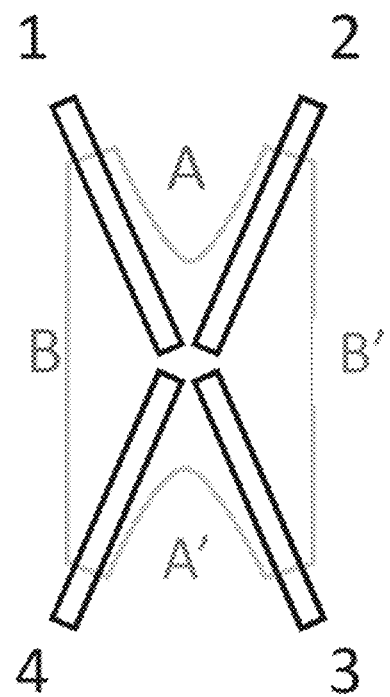
FIG. 1D depicts an integrated hinge having a four-pointed star-shape rigid structure in accordance to an embodiment of the present invention.
Figure 1D:
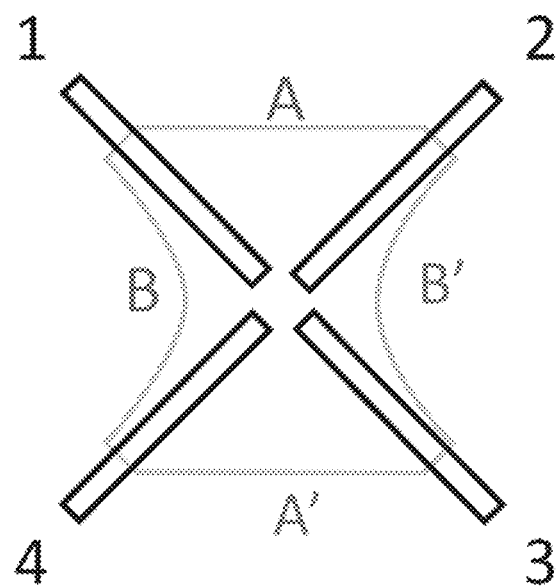

Referring to FIGS. 1A, 1B, 1C and 1D. In accordance to various embodiments of the present invention, the rigid structure can be a structure having two rods 1 and 2 arranged in a cross-shaped structure as shown in FIG. 1A, two rods 1 and 2 arranged in a 'V'-shaped structure as shown in FIG. 1B, two rods arranged in a 'T'-shaped structure, three rods 1, 2, and 3 arranged in a three-pointed star-shaped structure as shown in FIG. 1C, or four rods arranged in a four pointed star-shaped structure as shown in FIG. 1D. It will be apparent to an ordinarily-skilled person in the art that other shaped rigid structures having different number of rods for facilitating different types of movements of the connecting parts are realizable without deviating from the spirit of the present invention.

In accordance to one embodiment, the shape of the multi-rod rigid structure of the various configurations is not necessarily fixed by any fixing accessory (e.g. pin, nail, screw, bearing, clamp, etc.), instead the rigid structure is wrapped tightly in a flexible membrane with its 3D contour holding the rigid structure in place. The 3D contour property of the flexible membrane can be achieved by using molding or 3D knitting techniques. For example as shown in FIG. 1A, the two rods 1 and 2 arranged in the cross-shaped structure are wrapped in a flexible membrane having four edges A, A', B, and B'. One of the movements of this integrated hinge is the lateral rotations of the two rods 1 and 2 in respect with each other about their intersection along the same plane. Another movement is the lateral rotation of the two rods 1 and 2 in respect with each other about their intersection along different planes. For another example as shown in FIG. 1B, the two rods 1 and 2 arranged in a 'V'-shaped structure are wrapped in a flexible membrane having at least edge A. One of the movements of this integrated hinge is the lateral pivoting of the two rods 1 and 2 about the meeting point of the ends of the two rods and along the same plane. Another movement of this integrated hinge is the 3D pivoting of the two rods 1 and 2 about the meeting point of the ends of the two rods. A 'T'-shaped or 'Y'-shaped structure is also possible with two rods. For yet another example as shown in FIG. 1C, the three rods 1, 2, and 3 arranged in the three-pointed star-shaped structure are wrapped in a flexible membrane having three edges A, A', and B. For yet another example as shown in FIG. 1D, the four rods 1, 2, 3 and 4 arranged in the four-pointed star-shaped structure are wrapped in a flexible membrane having four edges A, A', B and B'.

In accordance to one embodiment, the rods of the rigid structure of the integrated hinge function as hinge arms. An article of the furniture assembly, such as a supporting beam, a leg, an apron, a base, a top, a deck, a door, and/or a surface panel is connected to one of the rods of the rigid structure, preferably at near an end of the rod distal from the other rod(s) such that the connected articles are allowed to rotate, pivot, and/or shift in respect with one and other or the furniture main body about the rigid structure depending on the configuration of the rigid structure. A foldable or collapsible overall furniture assembly is then constructed using the plurality of integrated hinges connecting the furniture articles.

In accordance to one embodiment, the one or more integrated hinges are fully integrated with one or more furniture articles, the flexible membrane encloses the rigid structures of the hinges as well as the one or more furniture articles forming one integrated piece of the overall furniture assembly.

In accordance to another embodiment, instead of having the multi-rod structure of the integrated hinge wrapped within the flexible membrane, the multi-rod rigid structure can be fixed by inserting the rods in pipes in a piping system biasedly arranged into the desired shape. The piping system can also provide additional rigidity and/or tensile strength to the integrated hinge.

In accordance to one embodiment, the rods in the rigid structure of the integrated hinge can be made of different materials with different weights, tensile strengths, and/or stiffnesses, to enable certain controlled shape deformations, and/or weight distributions of the furniture assembly incorporating combinations of such integrated hinge(s).

In accordance to one embodiment, the flexible membrane is made of elastic material or fabric such that the integrated hinge serves as a spring or a spring hinge with a biased position. This type of spring or spring hinge can also serve as a movement guide for a furniture article in guiding it back to its original position. The furniture assembly incorporating the integrated hinges and elastic flexible membrane may be able to maintain a default configuration without the use of any locking mechanism. The use of elastic flexible membrane may also provide desirable springiness to the furniture assembly of certain type of furniture such as sofas and beds. In accordance to other embodiments, the flexible membrane can also be of non-elastic material or fabric. The combined use of multiple integrated hinges having mixed flexible membranes made of materials or fabrics of different degrees of elasticity enable a variety of biased positions and parts' movements of the furniture assembly. In other words, the integrated hinge's behavior can be influenced by changing the membrane properties, giving more flexibility and control to the furniture functionality and design.

Figure 2:
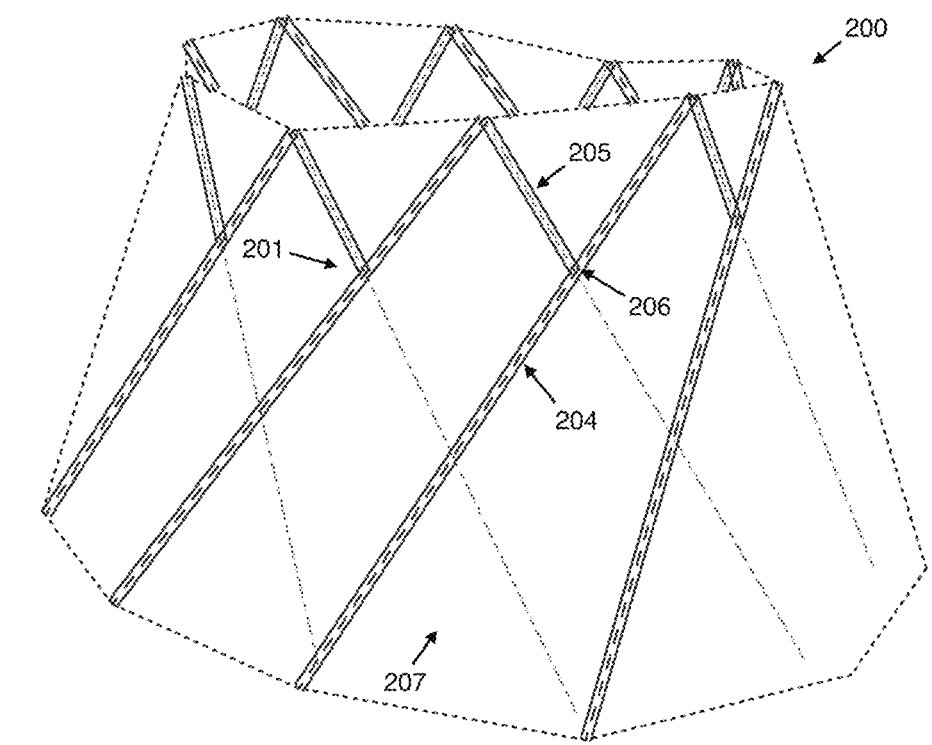
FIG. 2 depicts an exemplary collapsible infant cradle constructed using a plurality of integrated hinges, each having a cross shape rigid structure enhanced by piping, in accordance to an embodiment of the present invention.

Referring to FIG. 2. In accordance to one exemplary application, provided is a collapsible infant cradle 200 constructed using a number of integrated hinges 201, each having a cross-shaped rigid structure. The two rods 202 and 203 are used to construct the cross-shaped rigid structure in each integrated hinge 201. For each of the integrated hinges 201, the entire length of rod 202 is inserted inside a long pipe 204 and a portion of rod 203 is inserted inside a short pipe 205. One end of the short pipe 205 is connected to the long pipe 204 body at joint 206 arranged biasedly into a 'y' shape. There are corresponding through-holes on the body of the long pipe 204 at joint 206 to allow rod 203, having inserted in the short pipe 205, to pass through the body of the long pipe 204, forming the intersection of the two rods 202 and 203. The piping 204 and 205 and the rods 202 and 203 together provide the frame for the membrane and form the overall structure of the infant cradle 200. The bendability of joint 206 and the elasticity of the piping 204 and 205 and the rods 202 and 203 allow the infant cradle 200 to collapse.

The membrane 207 can be a single piece 3D-knitted fabric with channels to hold in place the piping 204 and 205 and the rods 202 and 203 of the cross-shaped rigid structures of the integrated hinges 201.

Figure 3:
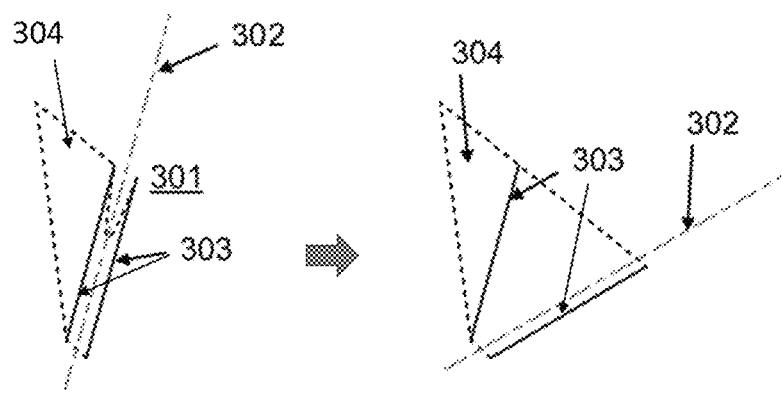
FIG. 3 depicts an integrated hinge having a single straight rod shape rigid structure in accordance to an embodiment of the present invention.

Referring to FIG. 3. In accordance to another embodiment of the present invention, an integrated hinge is provided having a single straight rod-shaped rigid structure 301 comprising a rod 302. The rod 302 is held in place in piping 303, which is made of elastic material. The piping 303 is wrapped within membrane 304. The edge of the membrane 304 distal to the piping 303 and rod 302 can be connected or fixed to another furniture article. A number of functions can be accomplished by this integrated hinge. For example, a rotational movement of the rod 302 stretches membrane 304, providing surface tension of membrane 304 and in turn the desired shape of a furniture article. With a highly flexible piping, such as that of piping 303, a number of configurations and angular movements of the rod 302 as a hinge arm can be accomplished.

Other exemplary applications include foldable booster seats, foldable chairs, collapsible sofas, strollers, and other transformable furniture constructed using integrated hinges of different shaped rigid structures. It will be apparent to an ordinarily-skilled person in the art that other applications incorporating the integrated hinges in their constructions are realizable without deviating from the spirit of the present invention.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A hinge for hingedly connecting an article of a furniture assembly to one or more articles or a main body of the furniture assembly comprising:
   a rigid structure comprising at least a first rod and a second, juxtaposed rod, wherein each of the rods functions as a hinge arm and wherein the first and second rods are positioned to touch each other at a rod intersection, and being rotatable relative to one another at the rod intersection; and
   a flexible membrane configured to enclose the rigid structure including the first and second rods and the rod intersection, the flexible membrane holding the first and second juxtaposed rods and permitting rotation of the rods relative to one another; and
   wherein the first rod is connected to one of the articles of the furniture assembly and the flexible membrane is connected to another one of the articles of the furniture assembly such that the connected articles are rotatable, pivot-able, or moveable in respect with one and other about the hinge; or the first rod is connected to one of the articles of the furniture assembly and the flexible membrane is connected to the main body of the furniture assembly such that the connected article is rotatable, pivot-able, or moveable in respect with the main body of the furniture assembly about the hinge.

2. The hinge of claim 1,
   wherein the flexible membrane is made of elastic material and has a three-dimensional contour configured to biasedly hold the rigid structure in a default shape; and
   wherein the hinge functions as a spring hinge.

3. The hinge of claim 2, further comprising:
   a flexible piping wrapped within the flexible membrane and configured in a default shape to allow insertion of the rod of the rigid structure there within.

4. The hinge of claim 1,
   wherein the flexible membrane is configured to enclose the rigid structure and at least one of the articles of the furniture assembly forming a single integrated piece of the furniture assembly.

5. The hinge of claim 1,
   wherein the flexible membrane is made of elastic material and has a three-dimensional contour configured to biasedly hold the rigid structure in a default shape; and
   wherein the hinge functions as a spring hinge to return the hinge and first and second rods to the default shape in the absence of an applied force.

6. The hinge of claim 5,
   wherein flexible membrane configured to enclose the rigid structure and at least one of the articles of the furniture assembly forming a single integrated piece of the furniture assembly.

7. The hinge of claim 5, further comprising:
   a flexible piping wrapped within the flexible membrane and configured in a default shape and to allow insertion of the rods of the rigid structure there within.

8. The hinge of claim 5,
   wherein the rigid structure comprises two rods arranged in a cross shape; and
   wherein the two rods are lateral-rotatable in respect with each other about their intersection along a same plane.

9. The hinge of claim 5,
   wherein the rigid structure comprises two rods arranged in a cross shape; and
   wherein the two rods are lateral-rotatable in respect with each other about their intersection along different planes.

10. The hinge of claim 5,
    wherein the rigid structure comprises two rods arranged in a 'V' shape; and
    wherein the two rods are pivot-able in respect with each other about their meeting point.

11. The hinge of claim 5,
    wherein the rigid structure comprises two rods arranged in a 'T' or 'Y' shape.

12. The hinge of claim 5,
    wherein the rigid structure comprises three rods arranged in a three-pointed star shape.

13. The hinge of claim 5,
    wherein the rigid structure comprises four rods arranged in a four-pointed star shape.

* * * * *